United States Patent
Lancaster et al.

[11] Patent Number: 5,854,894
[45] Date of Patent: Dec. 29, 1998

[54] MULTI-MEDIA SERVICES SYSTEM

[75] Inventors: Rodney Peter Lancaster, Heaton Mersey; Ian Lowrey, Burnage; Paul Jason Rogers, Rawtenstall; Nigel Kenneth Sinfield, Hadfield, all of Great Britain

[73] Assignee: International Computers Limited, London, United Kingdom

[21] Appl. No.: 677,770

[22] Filed: Jul. 10, 1996

[30] Foreign Application Priority Data

Jul. 26, 1995 [GB] United Kingdom .................... 9515336

[51] Int. Cl.$^6$ ....................................................... G06F 9/06
[52] U.S. Cl. ........................................ 395/200.43; 395/650
[58] Field of Search ..................... 348/7, 12, 13; 455/4.2, 5.1; 395/200.49, 200.48, 200.47, 650, 670, 672, 680; 364/514 R; H04N 7/173

[56] References Cited

U.S. PATENT DOCUMENTS

| | | | |
|---|---|---|---|
| 5,226,160 | 7/1993 | Waldron et al. | 395/650 |
| 5,477,263 | 12/1995 | O'Callagan et al. | 348/7 |
| 5,602,582 | 2/1997 | Wanderscheid et al. | 348/12 |
| 5,606,359 | 2/1997 | Youden et al. | 348/7 |

*Primary Examiner*—Mark R. Powell
*Assistant Examiner*—Uyen Le
*Attorney, Agent, or Firm*—Lee, Mann, Smith, McWilliams, Sweeney & Ohlson

[57] ABSTRACT

A video-on-demand (VoD) system comprises at least one server and a number of subscriber units connected to the server by way of a network (e.g. an ATM network). The server comprises a processing unit, data storage means for storing video data, and service supply means for responding to requests from subscribers by dispatching sequences of video data from said storage means over the network to said subscribers. The service supply means comprises a video application running in user space in the processing unit, and a VoD kernel I/O driver (VKID) running in kernel space in the processing unit, for reading data from said data storage means and dispatching the data to said network, in response to commands from the video application. Because the VKID is a kernel level module, it can perform this transfer quickly and efficiently, without the overhead of copying the data to and from user space.

9 Claims, 5 Drawing Sheets

MULTI-MEDIA SERVICES SYSTEM

BACKGROUND TO THE INVENTION

This invention relates to multi-media services systems. The invention is particularly, but not exclusively, concerned with video-on-demand (VoD) systems.

A VoD system is one that supplies video services on demand to a large number of customers or subscribers, over a communications network, from one or more central servers. The network may, for example comprise a telephone or cable network.

It is a requirement of such a system that each subscriber should be able to view any selected video at any time, rather than having to wait for a pre-scheduled broadcast to begin. This implies that different subscribers may be simultaneously viewing different videos, and that different subscribers may be simultaneously the same video but at different points. It is also desirable to provide subscribers with control facilities allowing them to pause, fast forward or reverse the selected videos, as if they were playing a video on a conventional VCR.

These requirements impose heavy processing demands on the central server, which must be able to retrieve different sequences of video data from storage and supply them to the subscribers in real time, without any gaps in service.

The object of the invention is to provide a novel VoD server in which this problem is alleviated.

SUMMARY OF THE INVENTION

According to the invention there is provided a multi-media services system comprising at least one server and a plurality of subscriber units connected to the server by way of a network, wherein the server comprises a processing unit, data storage means, and service supply means for responding to requests from subscribers by dispatching sequences of data from said storage means over the network to said subscribers, characterised in that said service supply means comprises a controlling application running in user space in the processing unit, and a pseudo device driver running in kernel space in the processing unit, for reading data from said data storage means and dispatching the data to said network, in response to commands from said controlling application, without copying the data to and from user space.

DESCRIPTION OF AN EMBODIMENT OF THE INVENTION

One embodiment of the invention will now be described by way of example with reference to the accompanying drawings.

Overview of the System

Figure 1:
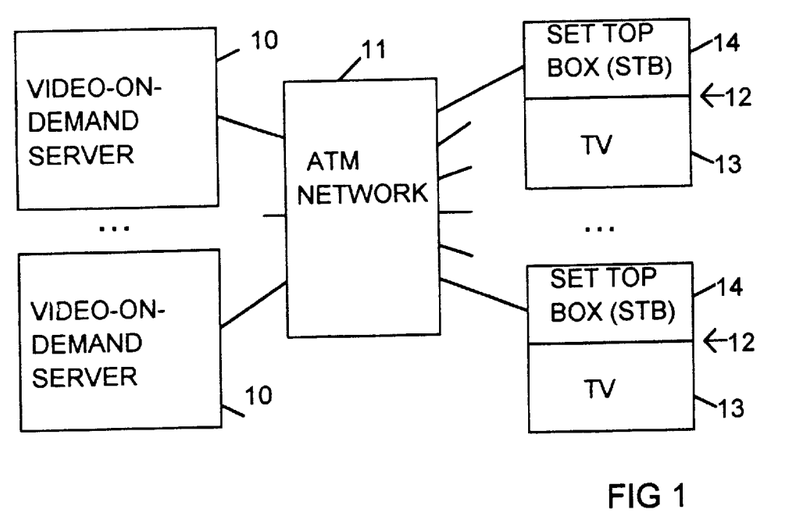
FIG. 1 is a block diagram of a VoD system in accordance with the present invention. The system includes number of servers.

Referring to FIG. 1, the video-on-demand system comprises a number of VoD servers 10, which supply video services to a large number of subscribers over a communications network 11. In this example, the network is an Asynchronous Transfer Mode (ATM) network. Each subscriber has subscriber equipment 12 comprising a conventional television set or monitor 13, connected to the network by means of a set-top box (STB) 14. The subscriber interacts with the STB by means of a hand-held remote control unit or some other means such as a keyboard or joystick.

Using the STB, the subscriber can select a video film, or other multimedia service, from a menu. When a film is selected, the STB sends a service request message to one of the VoD servers, requesting the selected video film. Once a film has been selected in this way, the subscriber can send messages via the STB, specifying user interaction commands such as:

start playing film from time 0 seconds, play film from xxx seconds, pause, fast reverse at n times normal play speed, fast forward at n times normal play speed, slow motion, stop.

VoD Server

Figure 2:
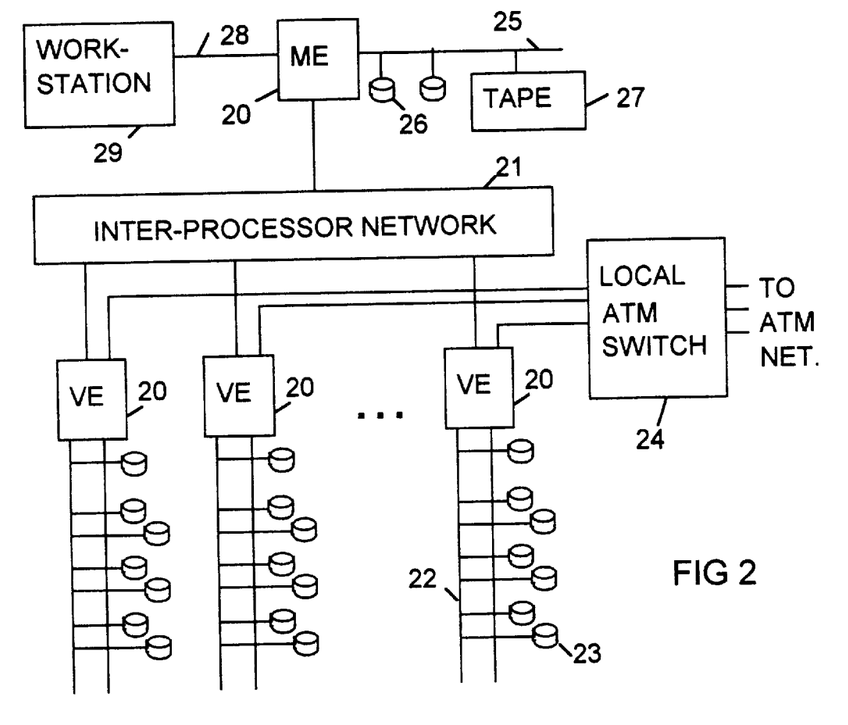
FIG. 2 is a block diagram showing one of the servers in more detail. The server includes a number of video elements.

FIG. 2 shows one of the VoD servers 10 in more detail. In this example, the server consists of a modified ICL Goldrush system. (Goldrush is a Trademark of International Computers Limited).

The server comprises a number of processor elements 20, each of which runs the ICL GR/NX operating system. The processor elements are interconnected by a high-speed interprocessor network 21, which allows any processing element to send messages to any other processing element. One of the processor elements, referred to as the management element (ME) is dedicated to system management activities. The remaining processor elements are referred to as video elements (VE) and are dedicated to providing interactive services, including video services.

Each of the video elements VE has two busses 22 connected to it. In this example, the busses 22 are standard SCSI (Small Computer System Interface) busses, but it will be appreciated that other types of bus may be used. Each of these busses is connected to up to six 4 gigabyte hard disk units 23. One of the disks attached to each VE acts as a system disk for the VE. The remaining disks collectively form a filestore for storing video data. The disks used for storing video data do not have any GR/NX file system on them; they are driven directly by applications as raw data disks.

Each video element VE is also connected to one input of a local ATM switch 24, through which the VE can be connected to the ATM network 12.

The management element ME also has a SCSI bus 25 connecting it to a number of hard disk units 26. One of these disks acts as a system disk for the ME. The ME is also connected by way of a LAN (local area network) to a system management workstation 29.

Management Element

The management element ME has a number of software components, including a user manager process, a media manager process, and a stats manager process.

The function of the user manager process is to add new subscribers to the system, or to remove existing subscribers.

The media manager provides a number of functions, including adding new films to the system, or removing existing films. The media manager makes use of film writer and film deleter processes in each VE to perform the actual writing and reading.

The stats manager collates and records statistics packets from the rest of the system. These can then be used for various purposes such as billing and usage analysis.

Video Element

Figure 3:
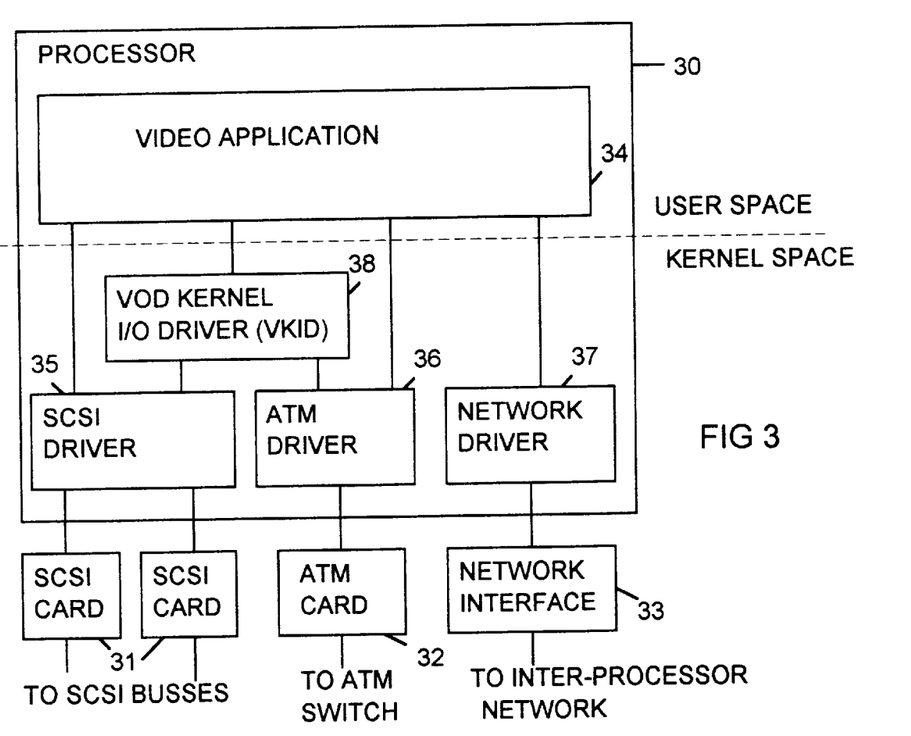
FIG. 3 is a block diagram showing one of the video elements in more detail.

FIG. 3 shows one of the video elements VE in more detail.

The video element comprises the following hardware components: a processor 30, SCSI cards 31 for interfacing with the SCSI busses, an ATM card 32 for interfacing with the local ATM switch, and a inter-processor network interface 33.

The video element includes the following software components: a video application 34, a SCSI driver 35, an ATM driver 36, a inter-processor network driver 37, and a VoD kernel I/O driver (VKID) 38.

Figure 4:
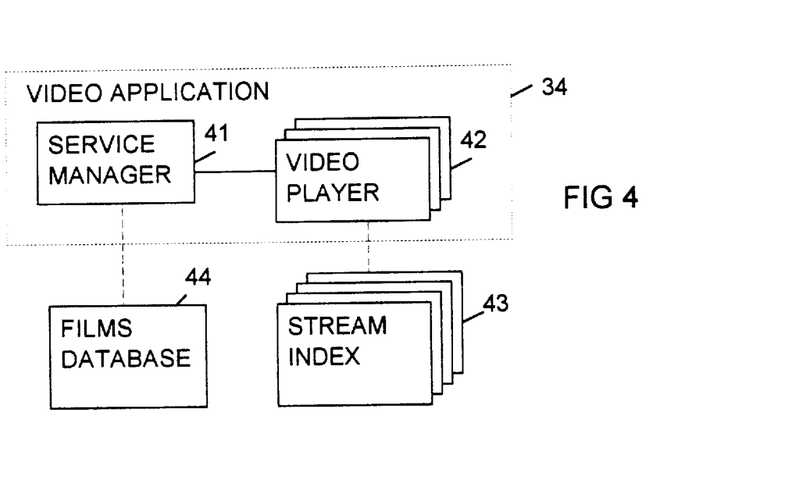
FIG. 4 is a schematic representation of a video application, and the databases used by it.

As shown in FIG. 4, the video application 34 includes a service manager process 41 and a number of video player processes 42. These are GR/NX processes that run in user space and are responsible for initiating and delivering video services demanded by the subscribers. These processes will be described in further detail below.

The SCSI driver, ATM driver and inter-processor network driver are conventional device drivers which run in kernel space. Their function is to manage communication with the SCSI cards, ATM card, and inter-processor network interface.

The VKID is a pseudo device driver which also runs in kernel space. Its purpose is to manage the transfer of video data from the SCSI disks to the ATM interface, in response to requests from the video application. Because the VKID is a kernel level module, it can perform this transfer quickly and efficiently, without the overhead of copying the data to and from user space. The VKID will be described in further detail below.

Video Data Storage

As mentioned above, each VE has a number of hard disk units which form a filestore for storing video data representing a number of films. The video data is compressed using a standard MPEG (Moving Picture Experts Group) encoding scheme. More than one copy of each film may be stored.

Each copy of each film is stored as three different versions: normal play, fast forward and fast reverse. The fast forward version contains every nth frame of data of the film, so that when this version is played back, the film will appear to run at n times normal speed in the forward direction. The fast reverse version is similar to the fast forward version except that the frames are in the reverse order, so that when this version is played back the film will appear to run at n times normal speed in the reverse direction. The use of separate fast forward and fast reverse versions of the film avoids the need for the extra processing that would be required to play back the normal version in a fast forward or fast reverse mode.

The video data is stored in video blocks. A video block is the smallest unit of video data that can be manipulated by a video player process, and contains a fixed length of continuous MPEG data, regardless of the content. The video blocks contain no format information and do not form part of the GR/NX file system. The video blocks are of a constant size for a given system configuration; typically, each block is 64 kilobytes in size.

Stream Indexes

Each VE stores a number of stream indexes 43, one for each copy of each video film stored in the video data filestore. The stream indexes are stored on the VE's system disk, under the GR/NX file system, and so are directly accessible by user space processes. As will be described, the stream indexes are used by the video player processes 42 to control playback of films.

Each stream index is an index to the video blocks that make up the video streams (e.g. fast forward, normal, fast reverse) for a particular copy of a film. The video blocks making up a particular film therefore do not need to be stored sequentially; they can be scattered anywhere in the video data filestore. This has the advantage that it makes fragmentation of the filestore irrelevant, and also allows the use of striping algorithms to optimise disk read performance.

Each stream index starts with a length field indicating the length of the index in bytes. A length value of 0 indicates that the film is still being written. This is followed by a sequence of stream records, each of which corresponds to a chunk of data from which playing can start. Each of these stream records consists of a stream record header, followed by a number of stream record items, one for each video block in this playable chunk.

The stream record header comprises the following fields:

The time position of the first video block in the chunk, relative to the start of the stream.

An identifier indicating which of the video streams (fast forward, normal, fast reverse) this record relates to.

The number of video blocks indexed by this record.

The number of video blocks indexed by the previous record.

The offset from the start of the first video block of the start of the independently playable data.

The length of the playable data (in bytes). Note that where a playable chunk finishes part-way through a video block, this length includes the whole of the video block, except where it is the last block in the stream.

The data rate at which the playable chunk is to be sent over the ATM network to the subscriber.

Flags to indicate whether this is the first or last record in the stream, or in the whole copy.

Each stream record item contains the following fields:

A device address, indicating which device the video block is located on.

A block address, indicating the location of the block within the specified device.

It should be noted that the frame numbers are relative to a particular stream, and that there are fewer frames in the fast forward, or fast reverse stream than in the normal stream. Within each stream index, the stream records are sorted into increasing order of the "equivalent frame number" of the first frame in the playable chunk. For a frame in the fast forward or fast reverse stream, the "equivalent frame number" is the frame number of the corresponding frame in the normal stream. For a frame in the normal stream, the "equivalent frame number" is the actual frame number.

Films Database

Each VE in the server has a local copy of a films database 44, held on its system disk. This contains information about all the films stored on the VoD server. Updates to the copies of the films database are performed by media daemons (not shown), which interact with each other to ensure consistency of the copies. As will be described, the films database is used by the service manager process 41 when initialising video player processes.

The films database consists of three tables: a hashing table, a selections table and a copies table.

The hashing table is addressed by a hash value, calculated from the film identifier, and indexes the first record in the selections table matching that hash value.

The selections table comprises a list of records, one for each different film stored in the VoD server. Each record contains the following fields:

A unique identifier for the film.

The film title.

A pointer to the next record in the selections table that matches the same hash value.

A pointer to the record in the copies table, describing the first copy of this film.

The copies table comprises a list of records, one for each copy of each film stored in the VoD server. Each record contains the following fields:

The name of the relevant stream index for this copy.

The identity of the VoD server on which the film copy is held.

The identity of the VE on which the film copy is held.

Flags which indicate whether the copy of the film is available, or faulty.

A count of the total number of video blocks that make up this film copy.

A pointer to the entry in the copies table relating to the next copy (if any) of the same film.

A pointer back to the corresponding record in the selections table.

The selection and copy tables have free pointers, pointing to the first free locations in those tables.

VoD Kernel I/O Driver (VKID)

The VKID is a kernel level software component, the purpose of which is to efficiently handle controlled rate transfer of video data from the disks to the network interface.

Figure 5:
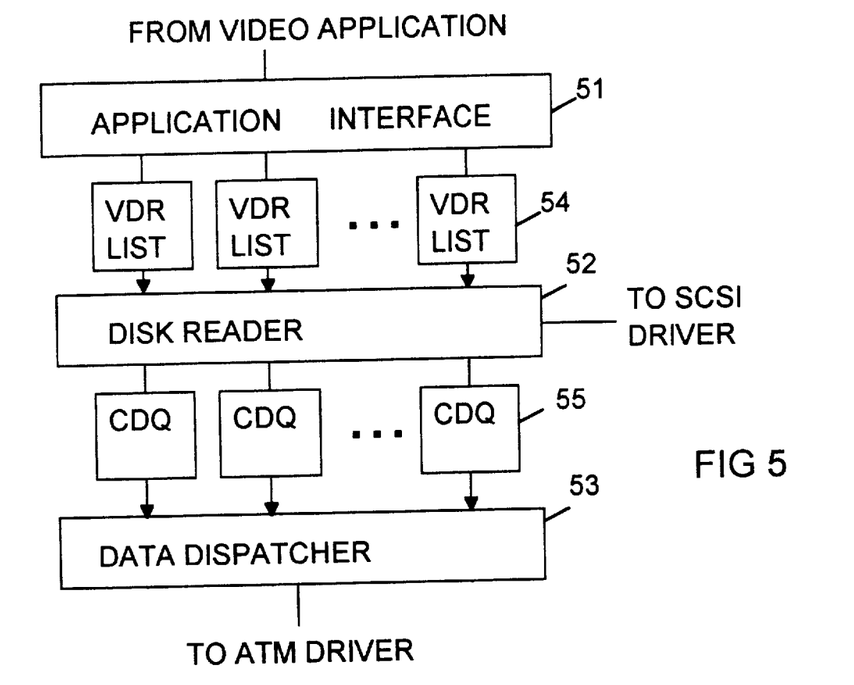
FIG. 5 is a block diagram of a VoD Kernel I/O Driver (VKID).

FIG. 5 shows the VKID in more detail. The VKID consists of three modules: an application interface 51, a disk reader 52, and a data dispatcher 53. The VKID supports a number of channels, each of which has a video data request (VDR) list 54 and a channel dispatch queue (CDQ) 55.

The application interface 51 provides an interface between the video application and the VKID. It receives calls from the video application, for performing a number of functions. In particular, it receives calls from the video player processes, to add requests for video blocks to the VDR lists.

The application interface appears to the user space programs as a device node.

The disk reader 52 works along the VDR list for each channel, servicing the requests by retrieving video data from the disks and placing it in the corresponding CDQ. The disk reader is event driven.

The data dispatcher 53 takes the data from the CDQs and sends it at a controlled rate over the ATM network to the appropriate subscribers' STBs. The dispatcher dispatches data in fixed-size frames. The dispatcher is driven by a constant period timer interrupt.

VKID Data Structures

Figure 6:
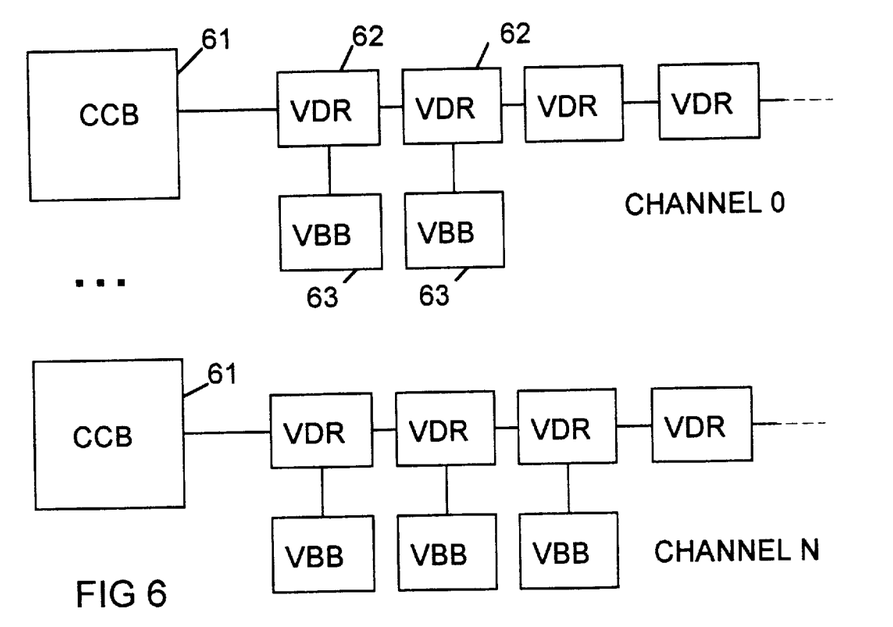
FIG. 6 is a schematic representation of data structures used by the VKID.

FIG. 6 shows the data structures in the VKID that define the channels, request queues, and channel dispatch queues.

Each channel has a channel control block (CCB) 61 that contains general control information for the channel, and pointers.

Each CCB contains pointers to a linked list of video data requests (VDRs) 62, forming the VDR list for the channel. Typically, there are tens of VDRs in each list.

Some of the VDRs, in turn, contain pointers to video block buffers (VBBs) 63. Each VBB is used to buffer a block of video data. Those VBBs that have been filled with video data constitute the channel dispatch queue (CDQ) for a given channel.

Unused VDRs are chained together to form a free VDR list. Similarly, unused VBBs are chained together as a free VBB list.

Channel Control Block (CCB)

Each CCB includes the following fields:

A state field indicating the current channel status.

Event flags, for notifying channel events to the video application.

An ATM address to which data from this channel is to be dispatched.

Pointers to the head and tail of the VDR list for this channel.

The number of VDRs in the VDR list.

A pointer to the VDR that the dispatcher is currently dealing with for this channel.

The sequence number of the VDR that the dispatcher is currently dealing with for this channel.

(time_credit) A time credit value.

(credit_cap) A credit capping threshold.

(time_per_frame) The length of time, in microseconds, that a frame occupies when displayed as video.

A pointer to the last VDR for which a read request was issued for this channel.

The size of the channel dispatch queue for this channel; i.e. the number of VDRs that have a full VBB associated with them.

Credit Capping

The time_credit is measure of how long this channel can afford to wait before it must dispatch another frame. Every time the dispatcher runs, time_credit is decremented by the elapsed time since it last ran. When time_credit becomes negative, a frame must be dispatched for this channel. When a frame is dispatched, time_credit for the channel is incremented by time_per_frame, to indicate that a frame will not be required for a while.

Unfortunately, it cannot be guaranteed that the dispatcher will run at regular intervals. This could happen because the SCSI driver hogs the processor for some time, and could result in a long elapsed time, making time_credit very negative. If this were allowed to happen, a number of consecutive iterations of the timer interrupt would result in frames being sent from this channel. These consecutive packets could cause a buffer overflow in the ATM switch, causing data to be lost in the network.

To solve this problem, time_credit is never allowed to become more negative than credit_cap.

Video Data Request (VDR)

Each VDR contains the following fields:

A status field indicating the current state of the VDR.

A pointer to the next VDR on the same VDR list.

A pointer to the previous VDR on the same VDR list.

A channel number, identifying which channel this VDR is associated with.

A byte count, used by the dispatcher to monitor progress when dispatching data from the associated VBB.

A sequence number used to monitor progress through a film.

The intended presentation rate of the data, in bytes per second. This is used by the dispatcher to determine how fast to deliver data to the ATM network. The presentation rate is constant for an individual VDR, but may change from one VDR to the next.

The number of bytes of valid data in the video block.

The device number in which the video block is stored.

The address of the start of the video block on the device.

A pointer to the VBB associated with this VDR (if one is allocated yet).

Video Block Buffer (VBB)

Each VBB contains the following fields:

a status field indicating the current state of the VBB.

A pointer to the next and previous VBBs in the free list (if the VBB is free).

A pointer to the associated VDR (if the VBB is in use).

A buffer header for passing to the disk driver. This is filled in by the disk reader.

The actual video data storage area.

The dispatcher can only dispatch data from a VBB in frames of a predetermined fixed size. In this example, the frame size is 376 bytes, but it will be appreciated that different frame sizes could be used. However, the video blocks are not guaranteed to be multiples of 376 bytes. To overcome this limitation, the VBBs are actually 376 bytes longer than the size requested at initialisation. As will be described, if the last frame to be sent from a VBB is less than the required 376 bytes, the difference may be made up by copying some data from the next VBB in the CDQ into the extra space at the end of the current VBB.

VKID Application Interface

The VKID application interface 51 handles function calls from the video application, including the following. Each of these calls specifies the channel number to which the call relates.

VKID_CMD_SETUP. This initialises the CCB for the specified channel. At this stage, no VDRs are chained to the CCB. The ATM address to which data from this channel is to be dispatched is written into the CCB, and the channel status is set to indicate that the channel is ready for use. The channel status is returned to the caller.

VKID_CMD_START_DISPATCH. This starts the dispatcher for the specified channel. If the dispatcher was stopped part-way through a VBB and no flush has been invoked, the dispatcher will carry on from exactly the point it was stopped at; otherwise it will start at the beginning of the first VDR at the head of the VDR list. The channel status is returned to the caller.

VKID_CMD_STOP_DISPATCH. This stops the dispatcher for the specified channel. The dispatcher is stopped immediately, even if it is part-way through a VBB. An event flag is set in the channel's CCB to indicate that the dispatcher has stopped, and the channel status is returned to the caller.

VKID_CMD_READ_STATUS. This returns the channel status to the caller.

VKID_CMD_QUEUE_VDR. This flushes any unwanted VDRs from the specified channel, and adds one or more new VDRs from the free list to the VDR list for that channel. The presentation rate, number of valid bytes in the video block, device number, and block address are all written into the appropriate fields of each VDR. The VKID application interface then calls the disk reader.

The VKID application interface then checks whether there are any outstanding events on this channel. If not, the application interface is put into a sleeping state for this channel, and remains in this state until it is awoken, e.g. by the disk reader as described below.

If the application interface has not been put into a sleeping state, or when it has been woken up, it returns the channel status to the caller, and finally resets the transient event flags in this channel's CCB.

VKID Status Structure

As mentioned, each of the above calls returns the channel status to the caller. The status is returned in the form of a status structure, comprising the following fields.

Event flags, identifying significant events relating to the specified channel. These are the same as the CCB event flags described above.

The sequence number of the VDR currently being dispatched. If the dispatcher is stopped, this gives the sequence number of the last VDR to be dispatched.

The sequence numbers of the VDRs at the head and tail of the VDR list.

The number of new VDRs this channel can accept.

VKID Disk Reader

Figure 7:
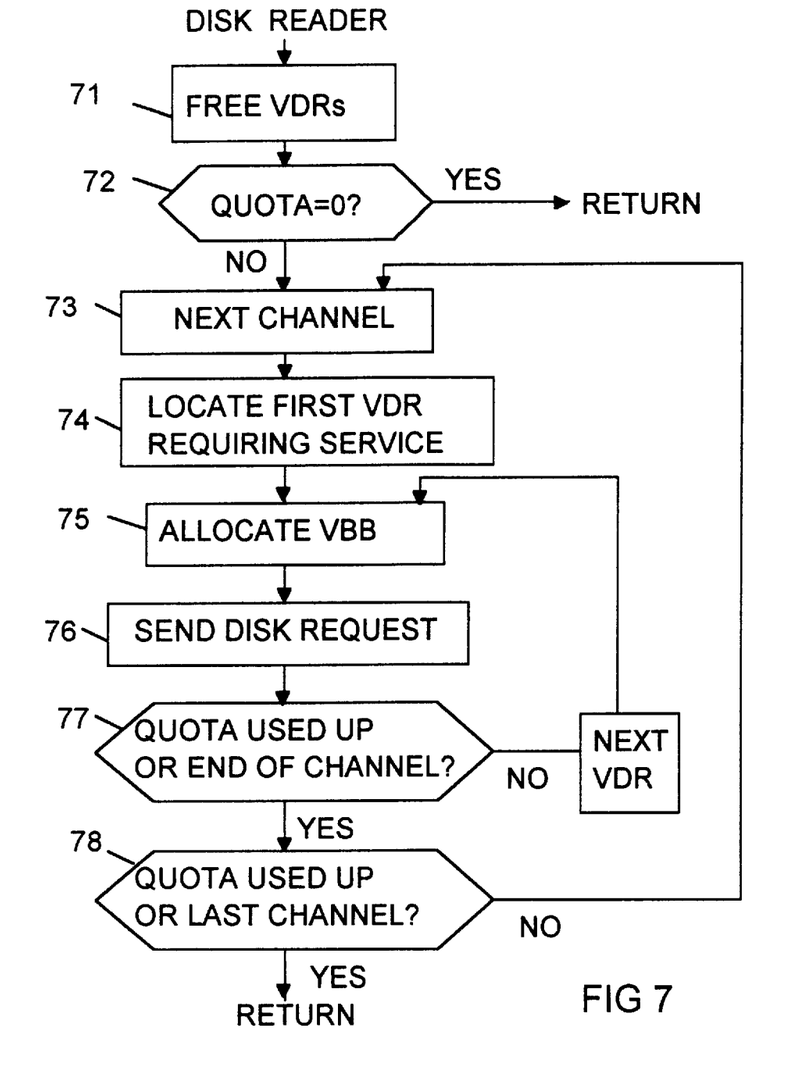
FIG. 7 is a flowchart showing a disk reader process forming part of the VKID.

FIG. 7 shows the operation of the disk reader.

The disk reader is called whenever it would be desirable to issue more disk read requests: for example after some more VDRs have been queued; after a VDR has been dispatched and its buffer becomes available; and after a disk request has been completed.

(Step 71) The disk reader first goes down each of the channels in turn, and frees any VDRs whose status indicates that the dispatcher has finished dispatching the associated VBB. The associated VBBs are also freed. As each VDR is freed, the disk reader checks whether this will reduce the number of VDRs in the VDR list to less than a predetermined threshold value. If so, an event flag is set to indicate that more VDRs need to be queued, and the VKID application interface is woken up for this channel. Thus, the video application will be informed that the VKID needs to be supplied with more VDRs.

(Step 72) The disk reader then calculates a quota indicating how many disk read requests can be issued in this pass.

This quota takes account of the maximum permitted number of outstanding read requests, and the current number of outstanding read requests. If the quota is zero, the disk reader returns.

Assuming that the quota is greater than zero, the disk reader then performs a loop (steps 73–78) in which it looks at each channel in turn, starting with the channel following the last channel that was processed by the disk reader the last time it ran. If the channel is available for reading, the disk reader performs the following actions.

(Step 74–77) The disk reader locates the next VDR requiring service in this channel. Starting from this VDR, each VDR in the channel is serviced in turn as follows. A VBB is allocated from the VBB free list to the VDR. A disk request is then sent to the SCSI disk driver interface, requesting it to read the video block specified by the VDR and to place it in the VBB.

(Step 78) When all the VDRs in the channel have been serviced, the disk reader moves on to the next channel, and repeats the above actions for the new channel. This continues until either all channels have been looked at, or the quota of read requests has been used up.

When the disk driver receives a disk request, it reads the video block, and places it in the specified VBB. It then calls a callback function in the disk reader. This callback function marks the status of the associated VDR as valid. It then wakes up the main function of the disk reader, thus initiating a fresh poll to find VDRs requiring to be serviced as described above.

VKID Data Dispatcher

Figure 8:
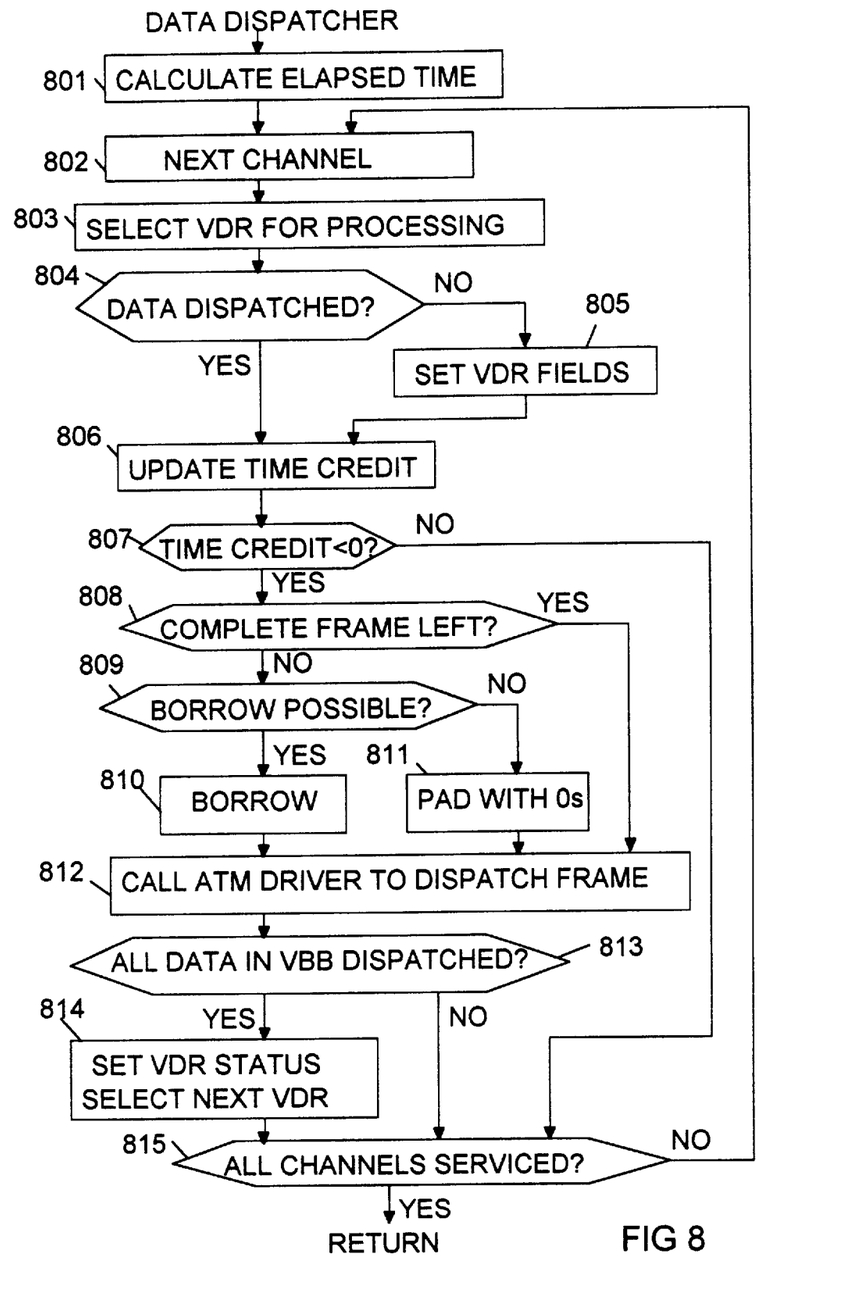
FIG. 8 is a flowchart showing a data dispatcher process forming part of the VKID.

FIG. 8 shows the operation of the data dispatcher.

The data dispatcher is responsible for taking data from the CDQs and presenting it to the ATM driver for transmission to a subscriber.

The dispatcher is driven by a constant-period timer interrupt. The period of this timer should be less than the lowest expected time needed to transmit a frame, and is typically about 1400 microseconds.

Each time the timer interrupt occurs, the data dispatcher first calculates time_delta, the elapsed time since the interrupt last occurred (step 801). It then executes a loop (steps 802–815) which services each channel in turn. Any channels that are not ready for dispatching are passed over.

(Step 803) The dispatcher selects the next VDR to be processed.

(Steps 804–805) If the VDR state indicates that no data has been dispatched yet from the associated VBB, the dispatcher performs the following actions. First, the time_per_frame field in the VDR is calculated from the frame size and the required presentation rate. The value of the credit_cap field in the VDR is set equal to —(time_per_frame). The VDR state is set to indicate that the dispatcher is now dispatching data from the associated VBB. Also, the sequence number field of the VDR is stored in the dispatcher sequence number field of the CCB; this will be used for status reporting.

(Step 806) The dispatcher now updates the time_credit field in the CCB by subtracting time_delta. If time_credit is more negative than credit_cap, the value of time_credit is set equal to credit_cap. In other words, credit_cap sets a limit on how negative time_credit can become.

(Step 807) The dispatcher then tests whether time_credit is negative. If not, no further processing is carried out for the channel.

(Steps 808–811) If time_credit is negative, it is time to dispatch another frame. First the number of bytes still to be dispatched from the associated VBB is calculated, by subtracting the byte count field of the VDR from the length field. If this number is less than the frame size (376 bytes), then there is not enough data in the VBB to form a complete frame. If borrowing is possible (i.e. if there is a next VBB in the CDQ, and that it has the same presentation rate as the current VBB), the dispatcher borrows enough bytes from the next VBB, by copying them into the extra space at the end of the current VBB. However, if borrowing is not possible, the dispatcher pads out the frame with zeroes. A data pointer is set to point to the start of the frame in the VBB, and the byte count field of the VDR is incremented by the frame size, with an adjustment to take account of any borrowing to ensure that the same data will not be sent twice.

(Step 812) The dispatcher then dispatches the frame by calling an ATM driver function. The main parameters required by this function are an ATM address, the frame size, and the data pointer. The ATM address is obtained from the ATM address field of the CCB. The credit_limit field is incremented by the value of time_per_frame, to indicate that another frame will not be required for a while.

(Steps 813–814) If all the data in the VBB associated with the current VDR has now been dispatched, the status of the VDR is set to indicate that the dispatcher has now finished dispatching this VBB. The VDR and the VBB will in due course be freed by the disk reader, as described above.

Service Manager Process

The service manager process will now be described in more detail.

The service manager process is a user space process, and is created on each VE in the system at the start of day. There is only one service manager on each VE.

When the service manager is started up, it first initialises its VE. It then listens for incoming messages. These incoming messages may come from subscribers (via the ATM network), from service managers on other VEs (via the inter-processor network), or from video player processes within the same VE. The service manager handles incoming messages as follows, depending on the message type.

(a) Object Locate request from STB.

When an STB requires to initiate a particular service (in this case, to play back a particular film), it first sends an Object Locate message over the network. This message is received by one of the service managers.

When it receives the object locate request, the service manager checks the films database, to find whether a copy of the requested film is available and, if so, where it is stored. If no valid copy of the requested film is found, the service manager sends a message back to the subscriber's STB, informing it that the request is rejected. If a valid copy of the requested film is available on any VE in the system, the service manager sends a request message to the service manager of that VE (which may be itself) requesting it to provide the required service.

The service manager that is requested to provide the service checks that the resource is available to run the relevant media application. If so, it creates the required media application (in this case, a video player process), and returns a confirmation message to the service manager from which the request was received. If on the other hand the necessary resource is not available, it returns a message to the requesting service manager, rejecting the request.

If the request is confirmed, then the service manager informs the STB of the location of the service manager that will be dealing with the provision of the service. If, on the other hand, the request is not confirmed, then the service manager accesses the films database again, to find another possible supplier. This is repeated until all potential suppliers have sent rejections, at which point the service manager will send a rejection back to the STB.

(b) Start Service request from STB.

When the STB requires to start the service, it issues a Start Service request to the service manager that is to provide the service.

The service manager first checks that it is expecting this request, i.e. that it has already created the necessary media application (video player process). If so, it starts up the video player process.

(c) User interaction command from STB.

During the provision of the service (i.e. during playback of the film) the user may issue commands, via the STB, e.g. to initiate fast forward, pause, fast reverse etc. When the service manager receives such a command, it simply forwards the message to the relevant media application (video player process) for the application to handle.

(d) Message from a media application (video player process), reporting a problem.

This message indicates that this service is about to fail. In this case, the service manager sends a request to another service manager, on another VE, requesting it to continue the service.

Video Player Process

The video player process will now be described in more detail.

The video player process is a user space process, created by the service manager to control playback of a specified film to a specified subscriber, and to handle all user interactions during playback. There will in general be several separate instances of this process running on each VE. A video player process will last as long as the film in question is being played back to the requesting subscriber.

When a video player process is created by the services manager, it is given the identifier of the stream index of the film copy it is to playback, and the identity of the subscriber to which the film is to be sent.

When the video player process starts to run, it opens a channel to the VKID and initialises it by means of a VKID_CMD_SETUP call. The video player then listens for commands from the subscriber, forwarded to it from the services manager as described above. The video player process handles these user interaction commands as follows.

(a) Start playing film from time 0 seconds.

In response to this command, the video player process accesses the stream index of the specified film copy. The video player process then makes a VKID_CMD_READ_STATUS call, to read the status of the VKID channel. This provides a value indicating the number of video data requests (VDRs) that this channel is currently able to accept. The video player then performs the following action.

The video player steps sequentially through the stream index from the start, reading the normal playback stream records for the required number of video blocks of the film. The video player then issues a VKID_CMD_QUEUE_VDR call to the VKID, requesting it to add VDRs for these video blocks to its VDR list. As described above, the VKID services each of these VDRs by reading the specified video block from hard disk, and then dispatching it to the subscriber over the ATM interface. After this call, the video player process waits until the VKID indicates that the number of VDRs it has waiting to be dispatched has fallen below the threshold level.

If no further user interactions are received during playback, the video player process continues repeating this action until it reaches the end of the stream index. It then exits, passing control back to the service manager.

(b) Play film from xxx seconds.

This is similar to the start command described above, except that in this case the video player process searches the stream index for the record corresponding to the specified start time, before it starts to step through the table. This command also specifies the required play mode (i.e. fast forward, normal, fast reverse or slow motion).

(c) Pause.

In response to this command, the video player process sends a VKID_CMD_STOP_DISPATCH command to the VKID, and then waits until it receives another user interaction command.

(d) Fast reverse at n times normal play speed.

This is similar to the play command described above, except that in this case the video player process accesses the fast reverse stream records of the stream index, starting from the first fast reverse stream record preceding the current stream index record so as to ensure that the film is correctly spliced with its fast reverse version. The process first flushes any queued data from the VKID.

(e) Fast forward at n times normal play speed.

This is similar to the play command described above, except that in this case the video player process accesses the fast forward stream records of the stream index, starting from the first fast forward stream record following the current stream index record so as to ensure that the film is correctly spliced with its fast forward version. The process first flushes any queued data from the VKID.

(f) Slow motion.

This is similar to the play command described above, except that in this case the video player process instructs the VKID to dispatch data at a slower rate, based on a specified slow motion speed.

(g) Stop.

In response to this command the video player calls the VKID, instructing it to close the channel. The video player process then exits, passing control back to the service manager.

The video player process gathers information about user commands and the progress of the film being played. It passes this information in statistics packets to the stats manager process in the ME.

The video player process maintains a schedule list, in which it keeps copies of all VKID_CMD_QUEUE_VDR calls sent to the VKID. This allows it to monitor the progress of the film as it is played, and is also used to ensure smooth splicing of the film with its fast forward and fast reverse versions when required. The schedule list is also the source of the progress information sent to the stats manager.

Conclusion

Although the embodiment of the invention described above is a VoD system, it will be appreciated that the invention may also be used in other forms of multi-media services system, where large quantities of data need to be supplied from storage to a large number of subscribers.

It will be appreciated that many modifications may be made to the system described above without departing from the scope of the invention.

We claim:

1. A multi-media services system comprising at least one server and a plurality of subscriber units connected to the server by way of a network, wherein the server comprises a processing unit, data storage means, and service supply means for responding to requests from subscribers by dispatching sequences of data from said storage means over the network to said subscribers, characterised in that said service supply means comprises a controlling application running in user space in the processing unit, and a pseudo device driver running in kernel space in the processing unit, for reading data from said data storage means and dispatching the data to said network, in response to commands from said controlling application, without copying the data to and from user space.

2. A system according to claim 1 wherein said pseudo device driver comprises a plurality of channels, each channel including a request list for storing requests for data from said controlling application, and a dispatch queue for storing data that has been read from said storage means and is ready to be dispatched to said network.

3. A system according to claim 2 wherein said pseudo device driver comprises:

(a) an application interface, for receiving said commands from said controlling application and, in response to said each of said commands, adding a request to the request list in a specified one of said channels;

(b) a storage reader, for accessing requests from said request list in each of said channels, reading data from the storage means in response to said requests, and placing said data in said dispatch queue in the same channel; and (c) dispatching means, for accessing the dispatch queue in each of said channels, and dispatching the data to said network.

4. A system according to claim 3 wherein said storage reader is event driven, and said dispatching means is driven by a constant period timer interrupt.

5. A server for use in a multi-media services system, the server comprising a processing unit, data storage means, and service supply means for responding to requests from subscribers by dispatching sequences of data from said storage means over a network to said subscribers, characterised in that said service supply means comprises a controlling application running in user space in the processing unit, and a pseudo device driver running in kernel space in the processing unit, for reading data from said data storage means and dispatching the data to said network, in response to commands from said controlling application, without copying the data to and from user space.

6. A server according to claim 5 wherein said pseudo device driver comprises a plurality of channels, each channel including a request list for storing requests for data from said controlling application, and a dispatch queue for storing data that has been read from said storage means and is ready to be dispatched to said network.

7. A server according to claim 6 wherein said pseudo device driver comprises:

(a) an application interface, for receiving said commands from said controlling application and, in response to said each of said commands, adding a request to the request list in a specified one of said channels;

(b) a storage reader, for accessing requests from said request list in each of said channels, reading data from the storage means in response to said requests, and placing said data in said dispatch queue in the same channel; and (c) dispatching means, for accessing the dispatch queue in each of said channels, and dispatching the data to said network.

8. A system according to claim 7 wherein said storage reader is event driven, and said dispatching means is driven by a constant period timer interrupt.

9. A video-on-demand system comprising at least one server and a plurality of subscriber units connected to the server by way of a network, wherein the server comprises a processing unit, data storage means for storing video data, and service supply means for responding to requests from subscribers by dispatching sequences of video data from said storage means over the network to said subscribers, characterised in that said service supply means comprises a controlling application running in user space in the processing unit, and a pseudo device driver running in kernel space in the processing unit, for reading data from said data storage means and dispatching the data to said network, in response to commands from said controlling application, without copying the data to and from user space.

* * * * *